United States Patent

Mackrle et al.

[11] 4,054,524
[45] Oct. 18, 1977

[54] APPARATUS FOR PURIFYING WASTE WATER CONTAINING ORGANIC CONTAMINANTS

[75] Inventors: Svatopluk Mackrle, Brno; Vladimir Mackrle, Prague; Oldrich Dracka, Brno, all of Czechoslovakia

[73] Assignee: Agrotechnika, narodny podnik, Zvolen, Czechoslovakia

[21] Appl. No.: 720,509

[22] Filed: Sept. 3, 1976

[30] Foreign Application Priority Data

Sept. 3, 1975 Czechoslovakia .................. 5999/75
Mar. 11, 1976 Czechoslovakia .................. 1593/76

[51] Int. Cl.² ............... B01D 21/00; C02B 1/28; C02C 5/04
[52] U.S. Cl. .............. 210/195 S; 210/208; 210/220; 210/521
[58] Field of Search ............ 210/50, 59, 60, 63, 210/198 R, 199, 205, 207, 208, 209, 219, 220, 513, 521, 522, 523, 195 S, 223 R, 221 R; 23/267 MS, 273 R

[56] References Cited

U.S. PATENT DOCUMENTS

| 3,393,804 | 7/1968 | Miller et al. | 210/207 |
|---|---|---|---|
| 3,429,442 | 2/1969 | Mackrle et al. | 210/207 |
| 3,473,665 | 10/1969 | Duff | 210/207 |
| 3,524,810 | 8/1970 | Mackrle et al. | 210/208 |
| 3,595,396 | 10/1969 | Mackrle et al. | 210/208 |
| 3,767,051 | 10/1973 | Thompson | 210/207 |
| 3,796,321 | 3/1974 | Kosonen | 210/207 |
| 3,799,346 | 3/1974 | Freese | 210/207 |
| 3,850,810 | 11/1974 | Teodoroiu | 210/207 |
| 3,878,101 | 4/1975 | Kennedy | 210/207 |
| 3,929,640 | 12/1975 | Dohnert | 210/207 |

*Primary Examiner*—Frank W. Lutter
*Assistant Examiner*—Frank Sever

[57] ABSTRACT

A cylindrical reaction chamber for purifying waste water has a separating zone extending substantially along its entire length and bounded transversely by first and second downwardly converging partition walls. The space in the vessel between the vessel wall and the first and second walls form separate waste water activation zones, in at least one of which an aerating device is disposed. Such zones are so configured that separate, oppositely directed transverse swirls of the waste water are established in the respective activating zones. A portion of the agitated water, after suitable treatment by baffle plates to remove the transverse swirling component, is introduced into the bottom of the separating zone for purification via fluid filtration. A pair of guide channels extend obliquely downwardly adjacent both ends of the separating zone, thereby providing a longitudinal circulation of waste water which promotes denitrification of certain contaminants in the waste water in the absence of aeration of the second activation zone.

14 Claims, 8 Drawing Figures

APPARATUS FOR PURIFYING WASTE WATER CONTAINING ORGANIC CONTAMINANTS

BACKGROUND OF THE INVENTION

The invention relates to facilities for purifying waste water having biodegradable organic contaminants, and more particularly to arrangements of this nature which employ a separating zone in communication with an aerated activation zone, which moves the waste water through an interface between such zones and into the separating zone, whereby the separated contaminants (in the form of sludge) drop by gravity backward into the aerated activation zone where they are reprocessed by extensive mixing. A disadvantage of such arrangement is that at peak load conditions, the reprocessing of the waste through the essentially single-channel activation zone does not operate efficiently, and an excess of sludge correspondingly appears at the purified water outlet at the top of the separation zone.

In addition, the reaction vessels in which the various zones are defined conventionally take the form of open or closed rectangular vessels, which are difficult and expensive to manufacture and to adjust for variations in load conditions.

In addition, the flexibility of the known arrangements for the treatment of different types of contaminants, such as nitrogenous wastes, is limited since the single activation zone operates at a constant level of aeration which, when adjusted to be satisfactory for the biodegradation of organic contaminants, does not satisfactorily serve to convert the nitrogenous portion of the wastes into gaseous nitrogen.

SUMMARY OF THE INVENTION

All of such disadvantages are overcome with the facilities constructed in accordance with the invention for the bio-purification of water having organic contaminants. In an illustrative embodiment, the reaction vessel is formed as a simply and easily manufactured and installed circular cylinder, which can be adapted to steadily increasing peak loads by the addition of similar sections end to end.

A generally wedge-shaped separating zone extends entirely or principally throughout the length of the cylindrical reaction vessel, such separation zone being defined between first and second boundary walls which terminate in spaced relation to each other and to the vessel wall, thereby defining an interface for the upward flow of activated waste water to be purified and for the discharge, by gravity, of contaminant containing sludge from the separating zone.

The respective regions between the first and second partition walls and the surrounding vessel wall define a pair of mutually separated, although interconnected, activating zones. Suitable facilities, including an aerating device in at least one of the activating zones, is adapted to cause the generation of transverse swirls of the waste water in the respective activating zones in mutually opposite directions, with a portion of such flow being directed upwardly through the above-mentioned interface after passing through a suitable baffle plate arrangement to eliminate a transverse component of motion. Such facilities may include either a second aerating device in the second activation zone, or alternatively another type of fluid-agitating device such as a fan rotatably supported in the second activating zone.

The first and second activating zones may be directly interconnected below the interface, in which case fluid streaming up through the interface is intercepted by a baffle member including a plurality of transversely spaced plates. In such case, the waste water is introduced centrally into the common region between the two activating zones, which are thus fed in parallel. Alternatively, the respective zones may be fed in series, with the waste water being introduced into only one of the activating zones, and the required transverse swirling in each zone being accomplished via an asymmetrical arrangement of plates below the interface.

In another embodiment, the first and second activation zones are physically separated by a partition wall that extends downwardly to a sludge-discharge region at the bottom of the vessel, such partition extending from the lower end of the first wall; thus, the interface is isolated from the first activating zone. Communication between the zones is effected at opposite longitudinal ends of the separating zone. For this purpose, a first guide plate or conduit extends obliquely downwardly through the vertical partition wall at the front end of the separating zone, while a second guide conduit or baffle extends obliquely downwardly in the opposite sense (as viewed from one end of the vessel) at the rear end of the separating zone. As a result, a longitudinal circulation of waste water takes place between the two activating zones throughout the length of the vessel. Such longitudinal circulation imparts a gradient of aeration into the water flow, which aids in the conversion, to gaseous nitrogen, of nitrogenous components of the water-borne impurities. Such effect is greatly enhanced in the absence of aerating facilities in the second activating zone.

BRIEF DESCRIPTION OF THE DRAWING

The invention is further set forth in the following detailed description taken in conjunction with the appended drawing, in which.

DETAILED DESCRIPTION

Figure 1:
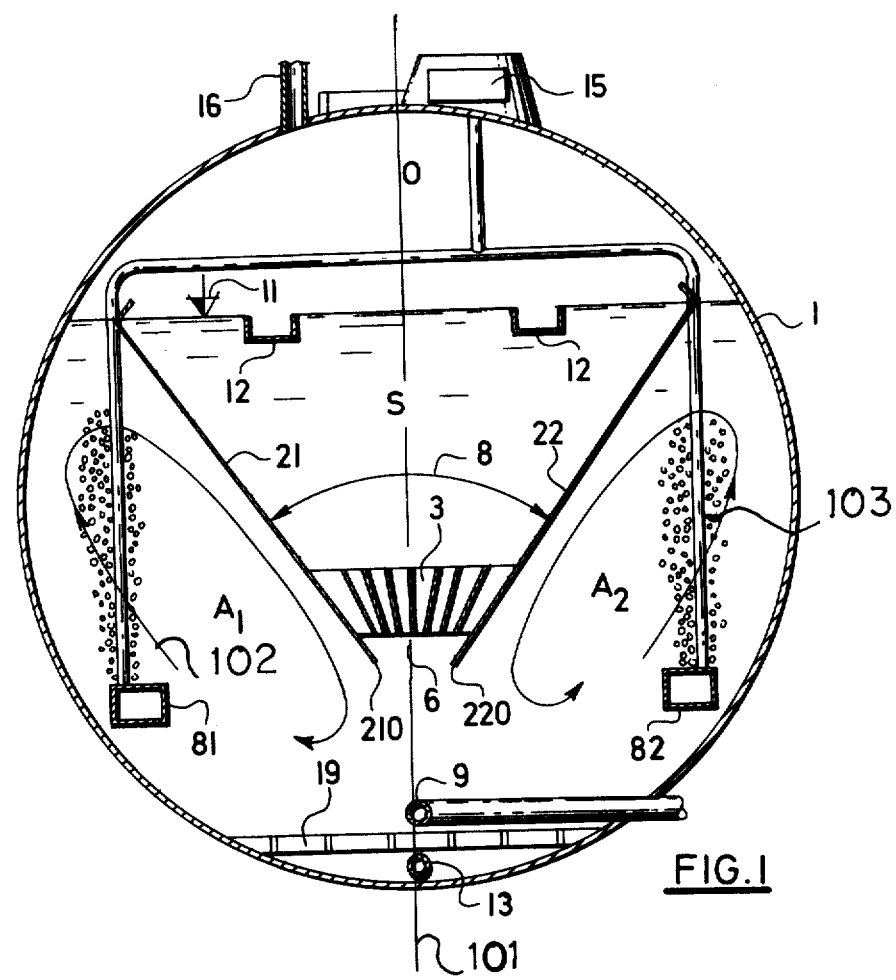
FIG. 1 is a cross-sectional view of a cylindrical reaction vessel having purification facilities in accordance with the invention.
Figure 2:
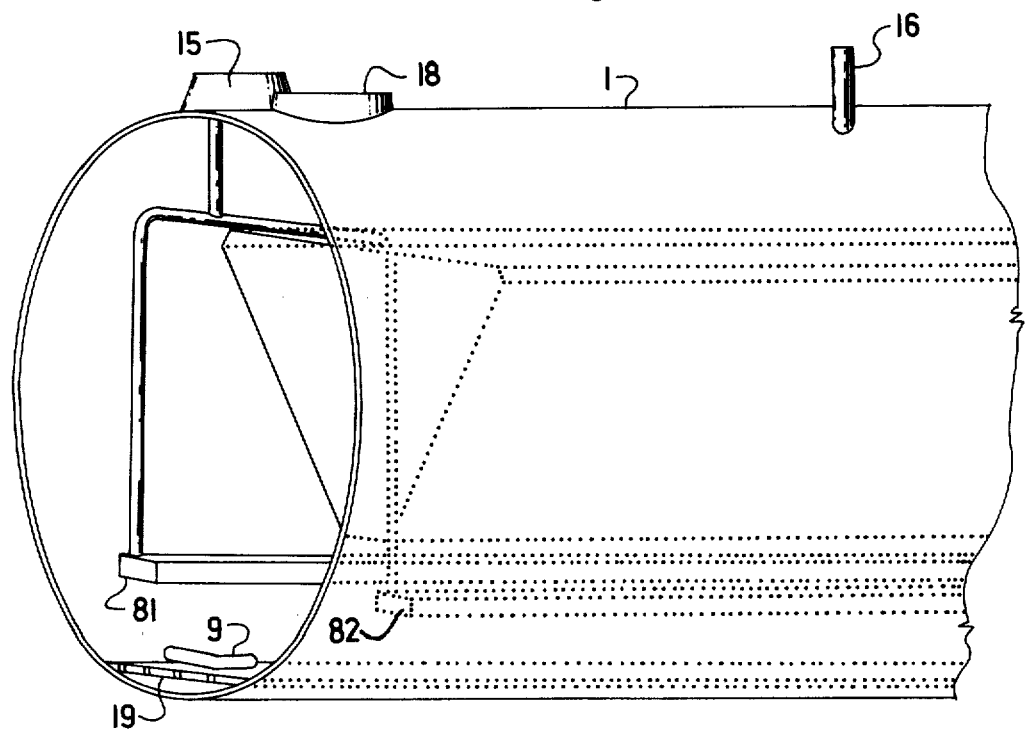
FIG. 2 is a view, angularly into one end of the cylindrical reaction vessel with the front cover removed, of a portion of the arrangement of FIG. 1.

Referring now to the drawing, there is depicted in FIGS. 1 and 2 a first embodiment of arrangement in accordance with the invention for purifying waste water having organic contaminants therein. The arrangement includes a cylindrical reaction vessel 1, which is provided with a pair of end walls (not shown) and in which are disposed a pair of longitudinally extending, downwardly converging partition walls 21 and 22. The walls 21 and 22, which may be affixed in the vessel 1 in any convenient manner, are convergent at an angle $\beta$ which, in a preferred arrangement, may lie in the range of 60°-120°.

The space between the sides of the respective walls 21 and 22 and the surrounding portions of the vessel wall define individual activating zones $A_1$ and $A_2$, which are adapted for the intensive mixing of waste water introduced therein.

In the arrangement of FIG. 1, a first aerating channel 81 extends from a first air pressure fitting 15 on the portion of the vessel wall overlying the separation zone S to an outlet location within the first activating zone $A_1$ as shown. Similarly, a second aerating conduit 82 extends from the fitting 15 to a point in the second activating zone $A_2$.

The lower ends of the partition walls 21 and 22 define therebetween a fluid-permeable interface 6, which is arranged to permit the upward flow of a portion of the fluid in the activating zones $A_1$ and $A_2$ into the separating space S, wherein the impurities are separated by fluid filtration. The purified water (which extends to a level identified as 11 in the drawing) is flowed outwardly from the facility through clean-water discharge conduits 12, while the separated contaminants (in the form of sludge) fall by gravity back through the interface 6 to the bottom of the vessel 1 via an apertured plate 19, where such impurities may be periodically removed by means of a sludge discharge conduit 13.

The portion of the vessel 1 above the water level 11 defines a de-aeration space O, which may be vented to the atmosphere by means of a conduit 16.

In the arrangement of FIG. 1, the activating zones $A_1$ and $A_2$ are symmetrically disposed about a central longitudinal plane 101 of the vessel 1, and are interconnected along such plane 101. A waste water inlet conduit 9 extends into the lower portion of the vessel 1 to terminate at a point along the axis 101 directly above the perforated plate 19, so that waste water can be supplied to the activating regions $A_1$ and $A_2$ in parallel. The conduit 9 in this case is situated directly below the center of the interface 6.

The combination of the symmetrical parallel feed of fluid from the conduits 9 and the outflow of oxygen from the aerating conduits 81 and 82 in the respective zones $A_1$ and $A_2$ effect both a thorough saturating of the waste water with oxygen and a formation of closed transverse streams, identified by arrows 102 and 103. The senses of rotation of the transverse swirls 102 and 103 are mutually opposite as shown; and a portion of such flow is propelled upwardly through the interface 6 and through an arrangement of baffle plates 3 to the interior of the separating zone S. The baffle plates 3, which extend longitudinally along the conduit and which are transversely spaced as shown, are effective to eliminate the transverse components of flow from the introduced waste water.

Contamination-containing sludge falling back through the baffle plates 3 and the interface 6 are intercepted and extensively re-worked in the swirls 102 and 103 in both of the activating zones $A_1$ and $A_2$. Because of the reprocessing of the sludge in a plurality of zones rather than in a single zone as in the prior art, the efficiency of such reprocessing is greatly increased even under peak load conditions, thereby substantially avoiding any sludge contamination of the water leaving the conduit 1 via the channels 12 at the top of the separating zone S.

In general, the separating zone S and the activating zones $A_1$ and $A_2$ may be longitudinally coextensive, with each zone extending completely along the length of the conduit. Alternatively, the separating zone S may terminate short of the vessel end plate on both ends, thereby leaving an activating end zone of circular cross-section on either side thereof. In such case, the respective opposite ends of the separating zone may be blocked off by suitable end plates, not shown in FIGS. 1 and 2, which restrict the upward flow of water from the activating zones to that provided by the interface 6. In such case, external access to the activating zones for maintenance and other purposes may be facilitated by the use of a manhole 18 (FIG. 2), which preferably communicates with the circular end portions of the activating zones.

Figure 3:
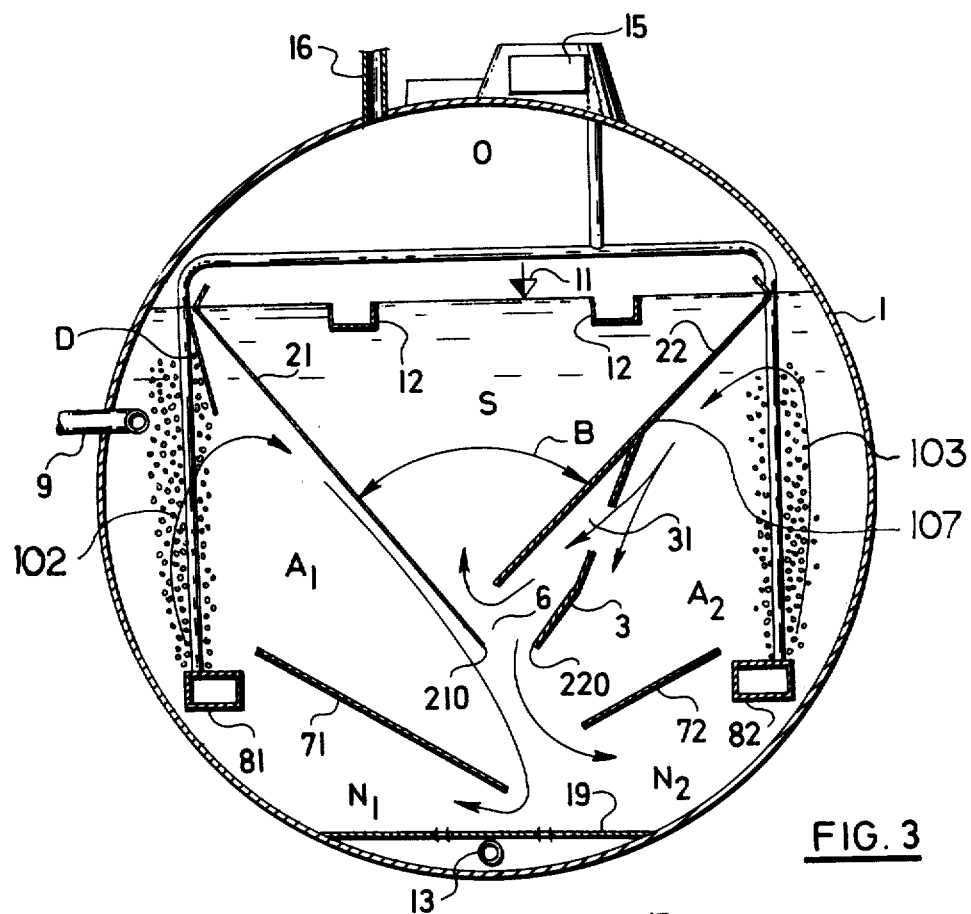
FIG. 3 is a cross-sectional view of a cylindrical reaction chamber, similar to FIG. 1 but embodying a different arrangement and interconnection of a pair of distinct activating zones.
Figure 5:
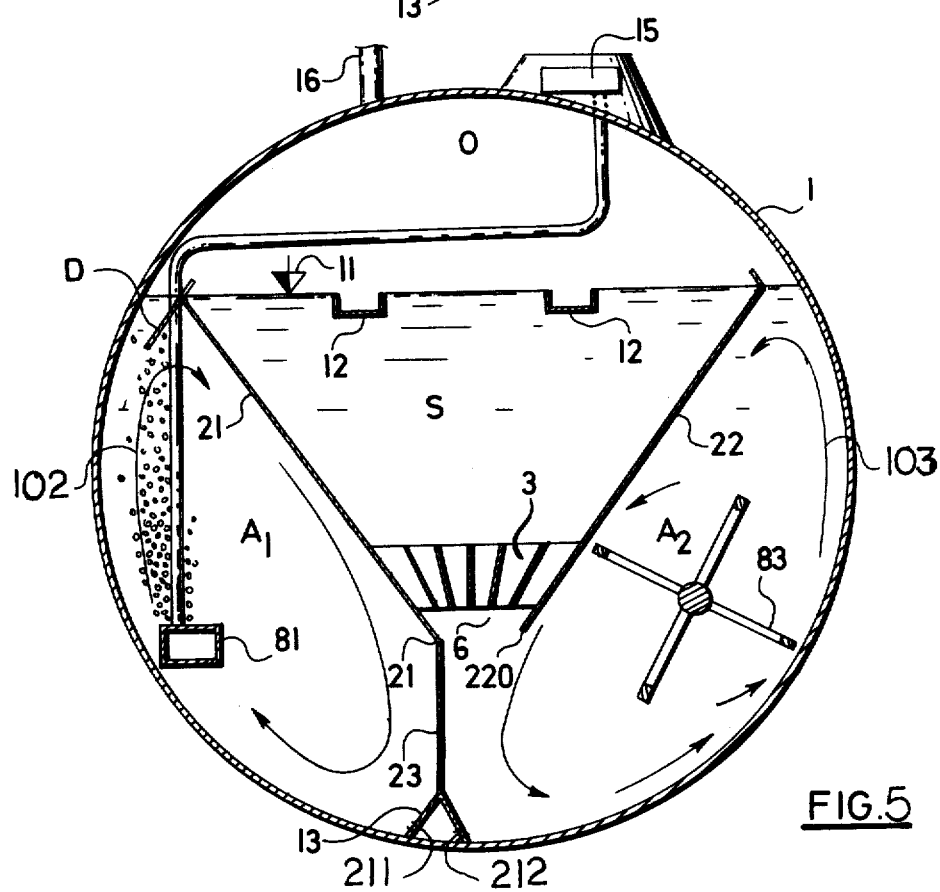
FIG. 5 is a sectional view taken along line 5—5 of FIG. 4.

An alternative configuration of the activating zones $A_1$ and $A_2$ is shown in FIG. 3. In such arrangement, the waste water inlet conduit 9 terminates within the first activating zone $A_1$, so that the zones $A_1$ and $A_2$ are essentially fed in series rather than in parallel as in FIGS. 1-2. In order to facilitate the generation of the closed transverse swirls 102 and 103 in the arrangement of FIG. 3, each of the zones $A_1$ and $A_2$ is provided with a suction sub-zone (respectively designated $N_1$ and $N_2$).

The sub-zone $N_1$ is defined between the wall of the conduit 1 and a downwardly obliquely extending plate 71, which is disposed below the partition wall 21 and which has a lower end 106 which projects below the interface 6 in sludge-intercepting relation therewith. The aerating conduit 81 in such case is disposed in the sub-zone $N_1$.

The sub-zone $N_2$ in the second activating zone $A_2$ is defined by a plate 72 which extends downwardly and obliquely, in an opposite sense to that of the plate 71, below and in spaced relation to the boundary wall 22. In such case, the aerating conduit 82 in the zone $A_2$ is also placed in the sub-zone $N_2$.

The arrangement of FIG. 3 also employs a baffle arrangement, corresponding to the system 3 of FIG. 1, for blocking the transverse swirl componemt of the waste water from entering the separating zone S through the interface 6. The particular arrangement shown in FIG. 3 is an additional plate 3, which extends downwardly in generally diverging relation from a point 107 along the boundary wall 22. The interior space between the plate 3 and the wall 22, terminating at the interface 6, acts as the transverse component inhibitor, and for this purpose an aperture 31 is disposed in the central portion of the plate 3 as shown for diverting a portion of the flow of waste water in the swirl 103. Because of the disposition of the various plates 71, 72 and 3 in the arrangement of FIG. 3, the asymmetrical arrangement of zones $A_1$ and $A_2$ depicted is effective to efficiently and thoroughly recirculate and rework sludge which is dropped through the interface 6 from the separating zone S, thereby giving the advantages of FIGS. 1 and 2.

If desired, a disintegrating element D, which communicates at its upper end with the de-aeration zone O above the conduits 12, may be supported within the first activating zone A₁ for comminuting floating wastes, such as paper, which are introduced into the zone A₁ via the conduit 9.

In addition, the perforated plate 19 and the underlying sludge-collecting conduit 13 may have the arrangement and function of the corresponding elements in FIGS. 1 and 2.

The arrangement of FIGS. 4–7 is adapted to introduce a longitudinal circulation of the waste water throughout the zones A₁ and A₂, in addition to the transverse swirls 102 and 103 therein. Such multi-plane displacement of the waste water helps establish gradients of aeration therein which are effective not only to biodegrade the organic components of the contamination in the incoming waste water, but also to convert various nitrogenous components in such contamination into gaseous nitrogen, thereby providing another degree of purification of the water. For this purpose, the normal transverse communication of the activating zones A₁ and A₂ in FIGS. 1–3 is inhibited by the use of a vertical partition wall 23 which extends longitudinally in the vessel 1 and downwardly from a lower end 210 of the partition wall 21, terminating in a common sludge discharge conduit 13. Access between the zones A₁ and A₂ and the conduit 13 is provided by passages 211, 212.

Figure 4:
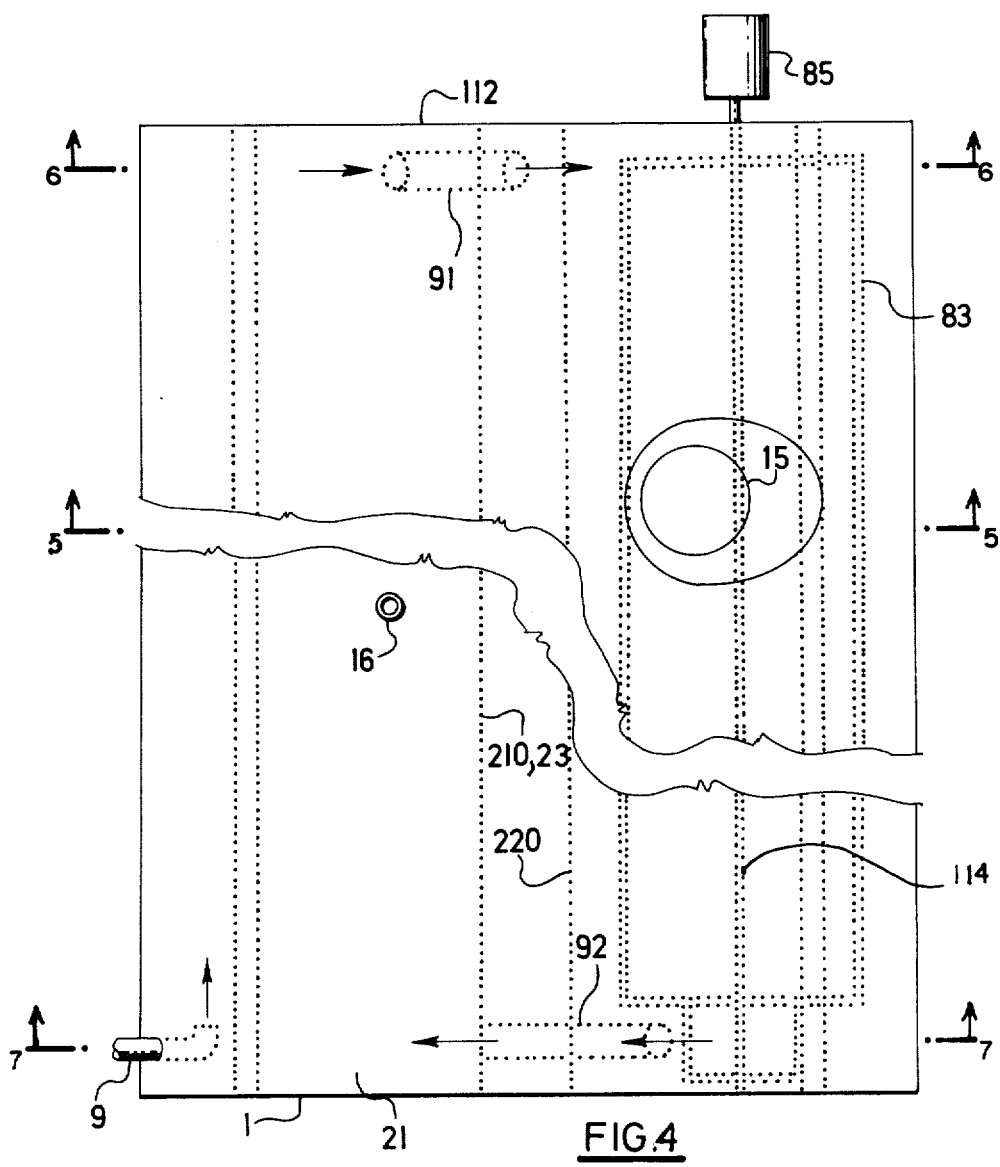
FIG. 4 is a longitudinal view of another embodiment of the purification facilities in accordance with the invention, such arrangement having facilities for imparting a longitudinal circulation of waste water within the reaction vessel.
Figure 7:
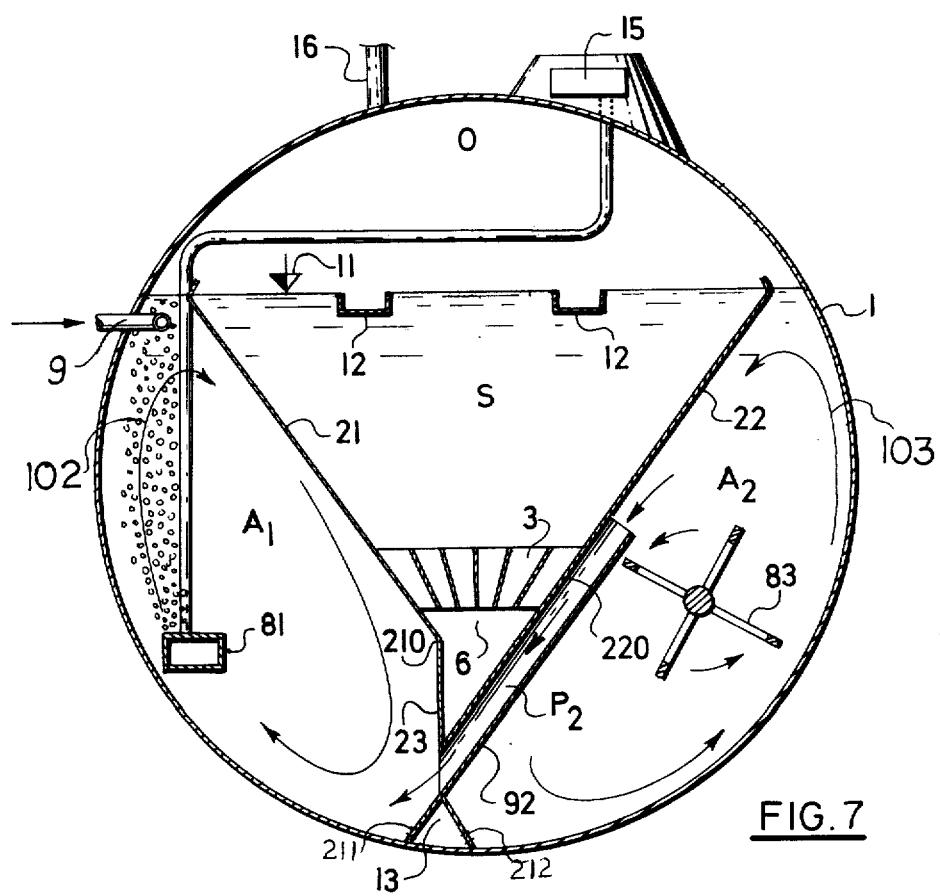
FIG. 7 is a sectional view taken along line 7—7 of FIG. 4.

As shown best in FIGS. 4 and 7, waste water is introduced into the conduit 9, which terminates at the top of the first activating zone A₁. Such waste water is transversely circulated in the swirl 102 by the effect of the aerating conduit 81, as before. A portion of the swirl 102 present at one end of the conduit 1 is coupled to the second activating zone A₂ by means of a guide conduit 91 which extends from the lower portion of the partition wall 21 through the vertical partition 23 between the activating zones and terminating beneath the interface 6.

In like manner, as shown best in FIGS. 4 and 7, a portion of the swirl 103 at the opposite axial end of the vessel 1 is coupled into a second downwardly and obliquely extending guide conduit 92, which extends from a lower end 220 of the partition wall 22 to an aperture 213 in the vertical partition wall 23. In this way, such portion is coupled into the swirl 102 in the first activating zone A₁, resulting in the longitudinal circulation shown by the peripheral arrows in FIG. 4.

In order to increase the gradient of aeration along such longitudinal path and to further increase the efficiency of denitrification of the impurities in the waste water, the second activating channel A₂ in FIGS. 4 and 7 is maintained free of aeration, and the required transverse swirling of the waste water therein is provided by a fan 83, which is rotatably supported in the zone A₂ by a shaft 114 coupled to a drive motor 85 (FIG. 7).

Figure 8:
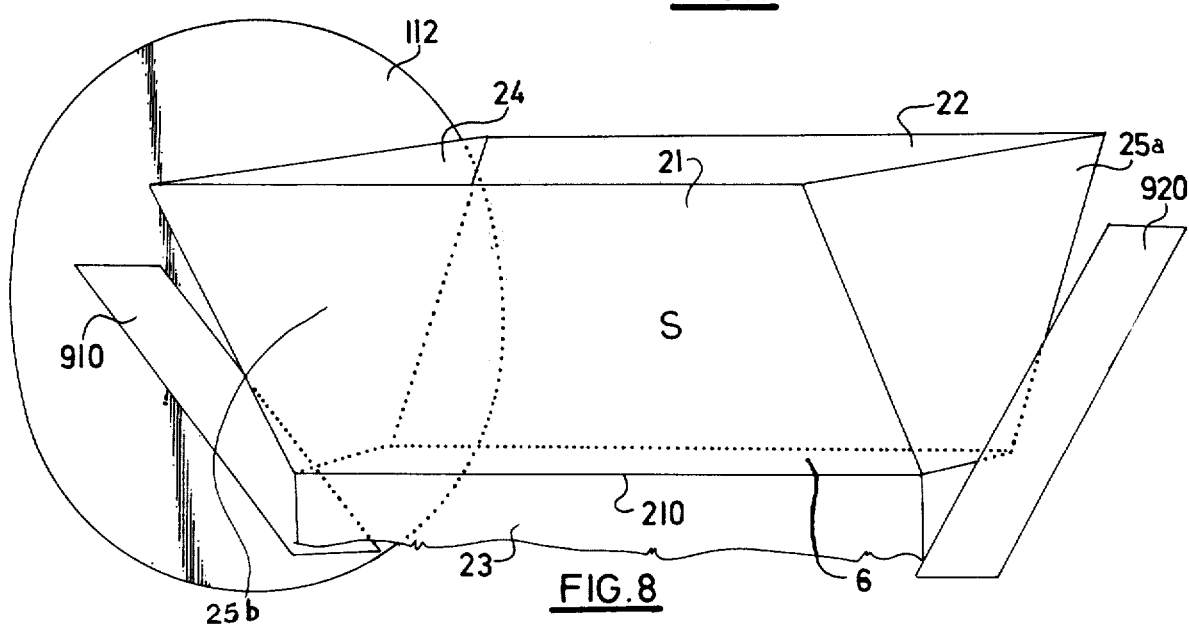
FIG. 8 is an isometric view of an alternative arrangement in accordance with the invention for imparting a longitudinal circulation of waste water through the reaction vessel, certain portions of the arrangement being removed for purposes of clarity.
Figure 6:
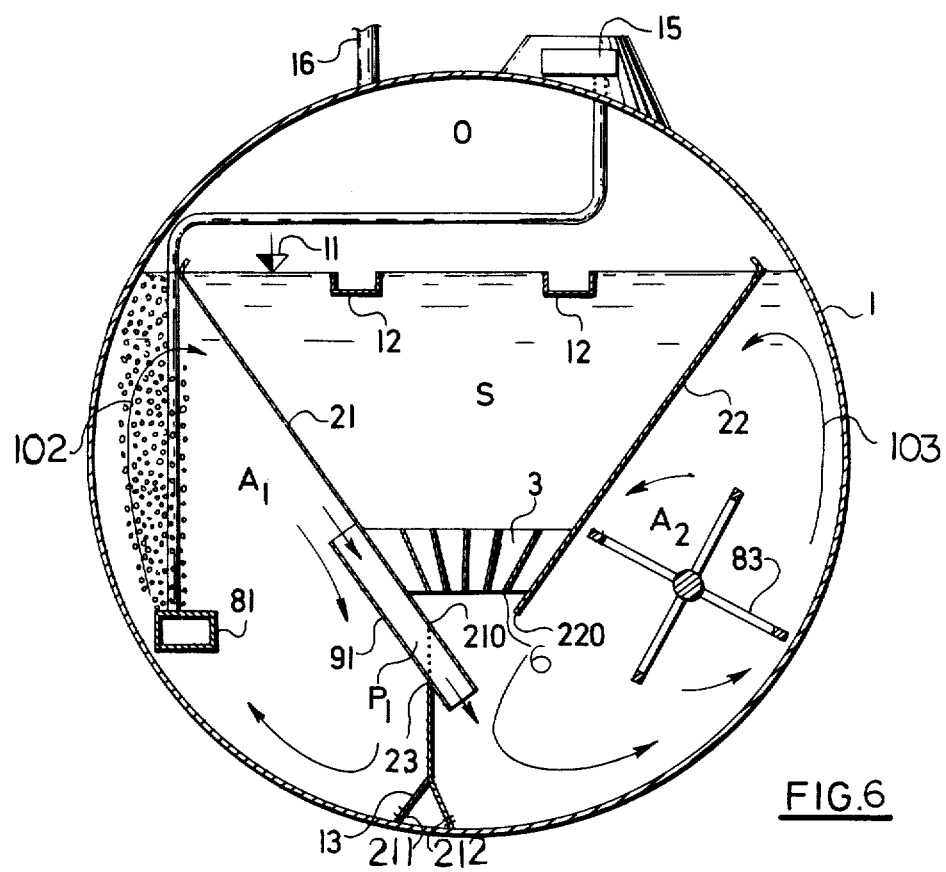
FIG. 6 is a sectional view taken along line 6—6 of FIG. 4.

An alternative scheme for providing the above-mentioned longitudinal circulation of waste water is depicted schematically in FIG. 8. In such arrangement, the separating zone S between the boundary walls 21 and 22 are terminated short of the end plates of the vessel, only one of which (112) is shown for clarity. A pair of end walls 25a and 25b are disposed at the ends of the walls 21 and 22 to longitudinally bound the section S. The zones A₁ and A₂, on the other hand, extend the full length of the full length of the vessel 1; for example, a generally circular end zone will extend between a boundary wall 25b of the separating zone S and the confronting end wall 112 of the vessel 1. On the other end, a circular end zone will be defined between the end wall 25a of the zone S and the other end wall of the vessel 1.

A guide baffle 910, analogous to the guide conduit 91 of FIGS. 4–7, extends downwardly and obliquely in the circular end region adjacent the end wall 25b of the zone S. In like manner, a guide baffle 920 analogous to the guide conduit 92 of FIGS. 4–7, extends downwardly and obliquely in the circular end portion adjacent the end plate 25a of the separation zone S. In other respects, the structure and manner of operation of FIG. 8 may track that of FIGS. 4–7.

In the foregoing, some illustrative arrangements of the invention have been described. Many variations and modifications will now occur to those skilled in the art. It is accordingly desired that the scope of the appended claims not be limited to the specific disclosure herein contained.

What is claimed is:

1. In an apparatus for purifying waste water containing nitrogenous organic contaminants, said apparatus comprising the following elements: a cylindrical reaction vessel having a longitudinal axis extending from front to rear of the vessel, first and second transversely spaced, downwardly converging partition walls extending longitudinally in the vessel in spaced relation to the vessel wall to define a contamination separating zone means between the first and second walls and to independently define a first activating zone means and a second activating zone means between the respective first and second walls and the vessel walls below the separating zone means, the lower ends of the first and second walls defining therebetween a fluid transferring interface zone means above at least one of said activating zone means for advancing fluid from such activating zone means into the separating zone means and for discharging contaminants in the form of sludge from the separating zone means to the bottom of the vessel, first conduit means terminating in communication with at least one of the activating zone means for admitting waste water into the vessel, means including first aerating means including first aerating means terminating in communication with the first activating zone means functioning to swirl said waste water in the first and second activating zone means in respectively opposite senses, second conduit means associated with the upper end of the separating zone, means for discharging pumped water from the vessel, and means disposed at the bottom of the tank in communication with the first and second activating zone means for collecting sludge discharged through the interface zone means from the separating zone means; said elements cooperative to impart a gradient of aeration into the flow of said waste water sufficient to effectively convert said nitrogenous organic contaminants into gaseous nitrogen.

2. Apparatus as defined in claim 1, in which the first aerating means comprises, in combination, air pressure fitting means coupled to the vessel wall above the separating zone means, and third conduit means extending into the vessel from the fitting means and terminating in the first activating zone means.

3. Apparatus as defined in claim 1, in which the transverse swirl establishing means further comprises second aerating means terminating in communication with the second activating zone means.

4. Apparatus as defined in claim 1, in which the swirl means further comprises fan-like propelling means rotatably supported in the second activating zone means.

5. Apparatus as defined in claim 1, further comprising baffle means communicating with the interface for inhibiting transfer of transverse swirls of water from both of said activating zone means to the separating zone means.

6. Apparatus as defined in claim 5, in which the transfer inhibiting means comprises a fan-like array of transversely spaced first plates disposed at the interface zone means.

7. Apparatus as defined in claim 5, in which the apparatus further comprises a second plate extending longitudinally in the vessel and obliquely downwardly in the first activating zone means below and in spaced relation to the first wall to terminate at a point below the interface, and a third plate extending longitudinally in the vessel in a direction obliquely downwardly and generally diverging from the second boundary wall in the second activating zone means, the third plate having an aperture therein for admitting a portion of the waste water in the second activating zone means into the space between the second wall and the third plate, the boundaries of the last-mentioned space constituting the transfer inhibiting means.

8. Apparatus as defined in claim 7, in which the apparatus further comprises a fourth plate extending longitudinally in the vessel and obliquely downwardly between and in spaced relation to the third plate and the vessel wall.

9. Apparatus as defined in claim 7, further comprising means for positioning the first aerating means in the space between the first plate and the vessel wall.

10. Apparatus as defined in claim 7, in which the transverse swirl establishing means comprises second aerating means, and in which the apparatus further comprises means for positioning the second aeration means in the space between the fourth plate and the vessel wall.

11. Apparatus as defined in claim 1, in which the vessel has a first front and a second rear wall, in which the front end of the separating zone means terminates in a plane rearwardly spaced from the first wall of the vessel, and in which the rear end of the separating zone means terminates in a plane forwardly spaced from the second wall of the vessel.

12. Apparatus as defined in claim 11, in which the separating zone means comprises a third front and a fourth rear wall, and in which the apparatus further comprises, in combination, first guide means extending diagonally downwardly in the space between the first and third walls, and second guide means extending diagonally downwardly in the space between the second and fourth walls, the first and second guide means extending in mutually opposite senses when viewed from one end of the vessel to establish a longitudinally closed circulation path for the waste water between the first and second activating zone means.

13. Apparatus as defined in claim 1, further comprising a third partition wall extending longitudinally in the vessel coextensive with the first and second walls and downwardly from the lower end of the first wall to physically separate the first and second activating zone means, third conduit means disposed at the front end of the separating zone means and extending diagonally downwardly through the third wall from the first to the second activating zones to effect communication of water from the first activating zone to the second activating zone means, and fourth conduit means disposed at the rear end of the separating zone means and extending diagonally downwardly from the second activating zone means to the first activating zone means to effect communication of water from the second activating zone to the first activating zone means, thereby to provide a longitudinal circulation path for the waste water between the first and second activating zone means.

14. Apparatus as defined in claim 1, in which the angle between the converging first and second walls is in the range of 60° – 120°.

* * * * *